(12) United States Patent
Anderson et al.

(10) Patent No.: US 12,235,067 B1
(45) Date of Patent: Feb. 25, 2025

(54) VARIABLE PAYLOAD MAGAZINE WITH AUTOMATIC RELOAD FEATURE

(71) Applicant: Government of the United States, as represented by the Secretary of the Air Force, Wright-Patterson AFB, OH (US)

(72) Inventors: Michael Anderson, Colorado Springs, CO (US); Grant Appel, O'Fallon, IL (US); Seth Konig, El Dorado Hills, CO (US); George Gardner, Butler, MO (US); Shawn Mathis, Waco, TX (US); William Yates, Columbia, SC (US); John Olson, Lakeville, MN (US); Hugh Briggs, Colorado Springs, CO (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 153 days.

(21) Appl. No.: 18/331,407

(22) Filed: Jun. 8, 2023

Related U.S. Application Data (63) Continuation-in-part of application No. 17/655,853, filed on Mar. 22, 2022, now Pat. No. 11,995,996.
(Continued)

(51) Int. Cl.
  *F41A 9/11* (2006.01)
  *F41A 9/00* (2006.01)
  *F41A 9/48* (2006.01)

(52) U.S. Cl.
  CPC .. *F41A 9/48* (2013.01); *F41A 9/11* (2013.01)

(58) Field of Classification Search
  CPC .............. F41A 9/00; F41A 9/11; B64C 39/02
  See application file for complete search history.

(56) References Cited

U.S. PATENT DOCUMENTS

| 3,876,201 A | 4/1975 | King |
| 7,293,492 B2 | 11/2007 | Brunn |

(Continued)

FOREIGN PATENT DOCUMENTS

| WO | WO-2012097334 A2 * | 7/2012 | .............. F41A 11/00 |

OTHER PUBLICATIONS

Appel, Konig, et al., Capabilities to Increase Access for Unmanned Surveillance Systems, AIAA 2023-0966, Jan. 19, 2023, SCITECH 2023, National Harbor, MD and online.

*Primary Examiner* — Yonel Beaulieu
(74) *Attorney, Agent, or Firm* — AFMCLO/JAZ; Larry L. Huston (57) ABSTRACT

A magazine for loading projectiles into a launch assembly by gravity feed. The magazine has a plurality blades radially extending from a central axis and defining a like plurality of compartments in an axially rotatable ring. The ring rests upon a stationary deck plate having a hole for gravity feed of the projectile into the launch assembly below. Projectiles having different fight characteristics are deposited into the compartments at a safe location, supported by the deck plate and the launch assembly with an associated device are transported to a hostile environment. A first projectile is launched by the launch assembly in a longitudinal direction. The launch assembly is retracted, automatically indexing the rotatable ring and dropping the next projectile through the hole and into the launch assembly for subsequent launch.

20 Claims, 11 Drawing Sheets

Related U.S. Application Data

(60) Provisional application No. 63/440,519, filed on Jan. 23, 2023.

(56) References Cited

U.S. PATENT DOCUMENTS

| | | | | |
|---|---|---|---|---|
| 8,538,605 | B1* | 9/2013 | Riley | B64D 1/08 |
| | | | | 701/3 |
| 10,222,175 | B2 | 3/2019 | Couce | |
| 11,838,094 | B1* | 12/2023 | Anderson | H04B 7/15507 |
| 11,995,996 | B1* | 5/2024 | Puglisi | B64C 39/024 |
| 12,063,095 | B1* | 8/2024 | Anderson | H04W 4/44 |
| 2012/0180354 | A1* | 7/2012 | Sullivan | F41A 21/48 |
| | | | | 42/16 |
| 2014/0251123 | A1 | 9/2014 | Venema | |
| 2016/0109940 | A1 | 4/2016 | Lyren et al. | |
| 2016/0293015 | A1* | 10/2016 | Bragin | B64U 30/293 |
| 2019/0367169 | A1 | 12/2019 | O'Leary | |
| 2023/0224018 | A1* | 7/2023 | Anderson | H04B 7/18504 |
| | | | | 455/431 |

* cited by examiner

VARIABLE PAYLOAD MAGAZINE WITH AUTOMATIC RELOAD FEATURE

CROSS REFERENCE TO RELATED APPLICATIONS

This application is a Continuation-In-Part of patent application Ser. No. 17/655,853 filed Mar. 22, 2022 now U.S. Pat. No. 11,995,996 B1, and claims the benefit of provisional U.S. patent application Ser. No. 63/440,519 filed Jan. 23, 2023, the disclosures of which are incorporated herein by reference.

STATEMENT OF GOVERNMENT INTEREST

The invention described and claimed herein may be manufactured, licensed and used by and for the Government of the United States of America for all government purposes without the payment of any royalty.

FIELD OF THE INVENTION

This invention is directed to a rotatable magazine for gravity loading different projectiles into a launcher and more particularly to such a magazine which automatically reloads the launcher upon firing a projectile.

BACKGROUND OF THE INVENTION

Hostile environments can present significant challenges. Personnel may not be able to directly access room or areas of interest in the hostile environment, whether indoors or outdoors. For example, toxic gases, radiation, adverse personnel, etc. may prevent operators from entering the hostile environment. Robots may be able to enter the hostile environment to a point, but can be stopped by obstructions. If walls, stairs, boulders, tunnels, vehicles, debris, etc. can obstruct the line of sight communication and further advance into the hostile environment.

Therefore it may be desirable to launch a payload into the hostile environment for intelligence, surveillance and reconnaissance [ISR]. In civil contexts, such systems would be valuable assets for search and rescue missions. The payload can launch over or beyond the obstruction for continued ISR. But the same payload may not be suitable for all missions. For example, a first mission may require a first payload, and subsequent missions may require different payloads. As used herein 'different payloads' refers to payloads having different flight characteristics.

The payload may include a breaching device, a communication system component or a sensor. A breaching device may comprise an explosive ordinance or sharp projectile. A communication system component may comprise a repeater or speaker. The sensor may comprise any of or any combination of a microphone, video camera, thermal imaging camera, infrared camera, radiation detector, explosive detector, GPS location, narcotics detector, thermometer, vibration detector, chemical/biological weapons detector, etc. The payloads form no part of the invention, except as may be specifically claimed below.

It is apparent these payloads may have different flight characteristics [size, weight, drag], resulting in corresponding different retractions of the carriage to accommodate the specific payload. The payload is weighed in the carriage and a launch algorithm computes retraction distance [and corresponding spring force], and trajectory angle based upon payload weight, size and distance to target.

But it is infeasible to have multiple, different launch devices for each mission. Space and weight constraints prevent the loading and transport of plural launch devices. If only a single launch device is selected, it may not be suitable to launch the specific payload best suited for that mission.

Accordingly, it is an object of this invention to provide a rotatable, gravity feed magazine for a launch device which can operate in hostile environments and which magazine is capable of loading different payloads into a launcher configured for launching the different payloads. And it is a further object of this invention to provide such a magazine capable of loading different payloads without changing out components of the device during a mission and which can automatically reload the launch device.

SUMMARY OF THE INVENTION

In one embodiment the invention comprises a magazine for gravity loading projectiles onto a projectile delivery device having a longitudinally retractable bucket for receiving a projectile. The magazine comprises a stationary deck plate having a central axis, and further having a hole therethrough and aligned with a longitudinally retractable bucket of the projectile delivery device; a ring disposed on the deck plate and divided into a first plurality of compartments, each compartment being sized to removably receive a projectile therein, the ring being rotatable about the central axis; and an arm intermittently intercepting the ring and operably associated with the longitudinally retractable bucket, the arm circumferentially indexing the ring one compartment upon longitudinal retraction of the bucket.

DETAILED DESCRIPTION OF THE INVENTION

Figure 1:
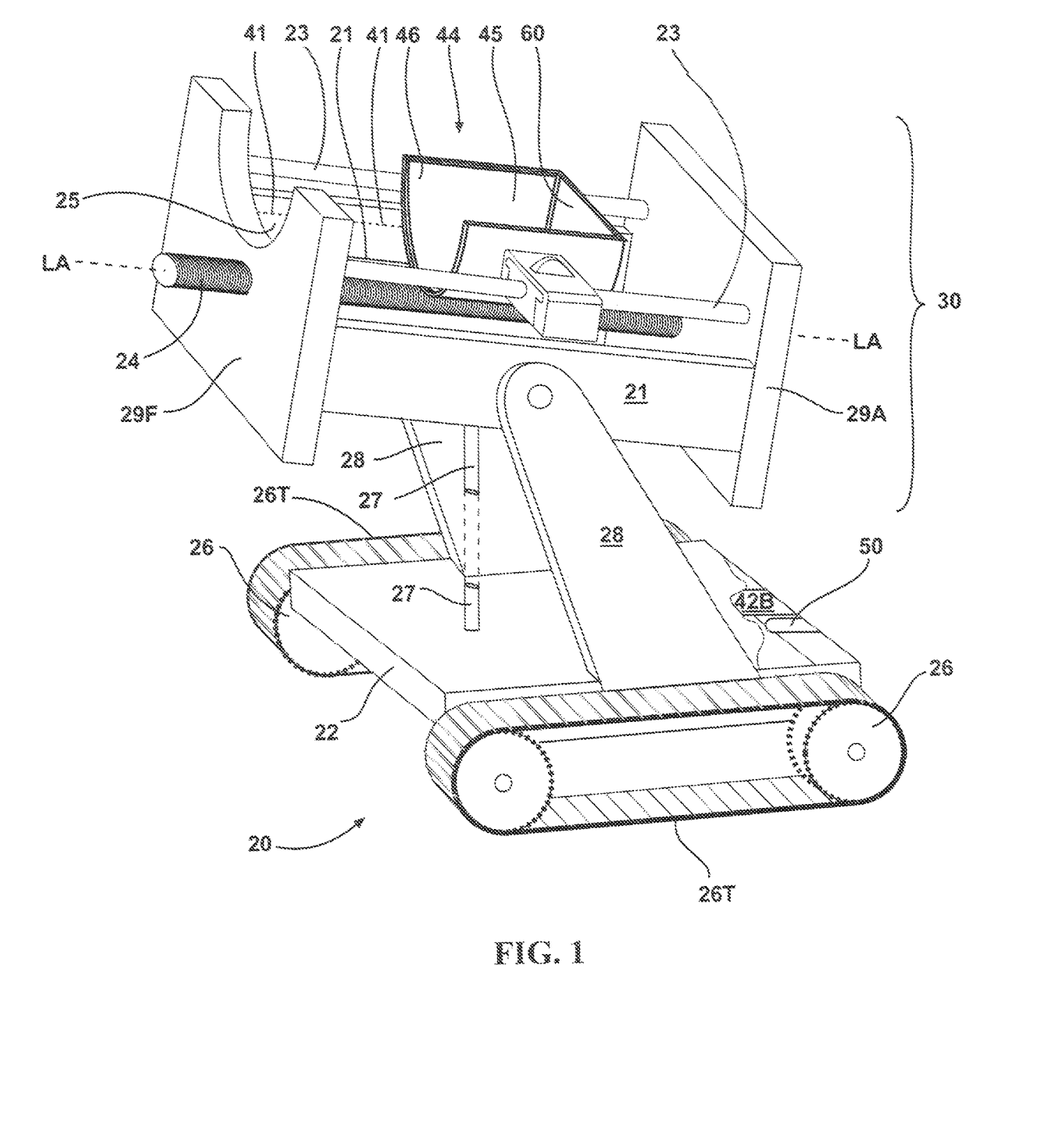
FIG. 1 is a perspective view of a launcher device according to the present invention.
Figure 2:
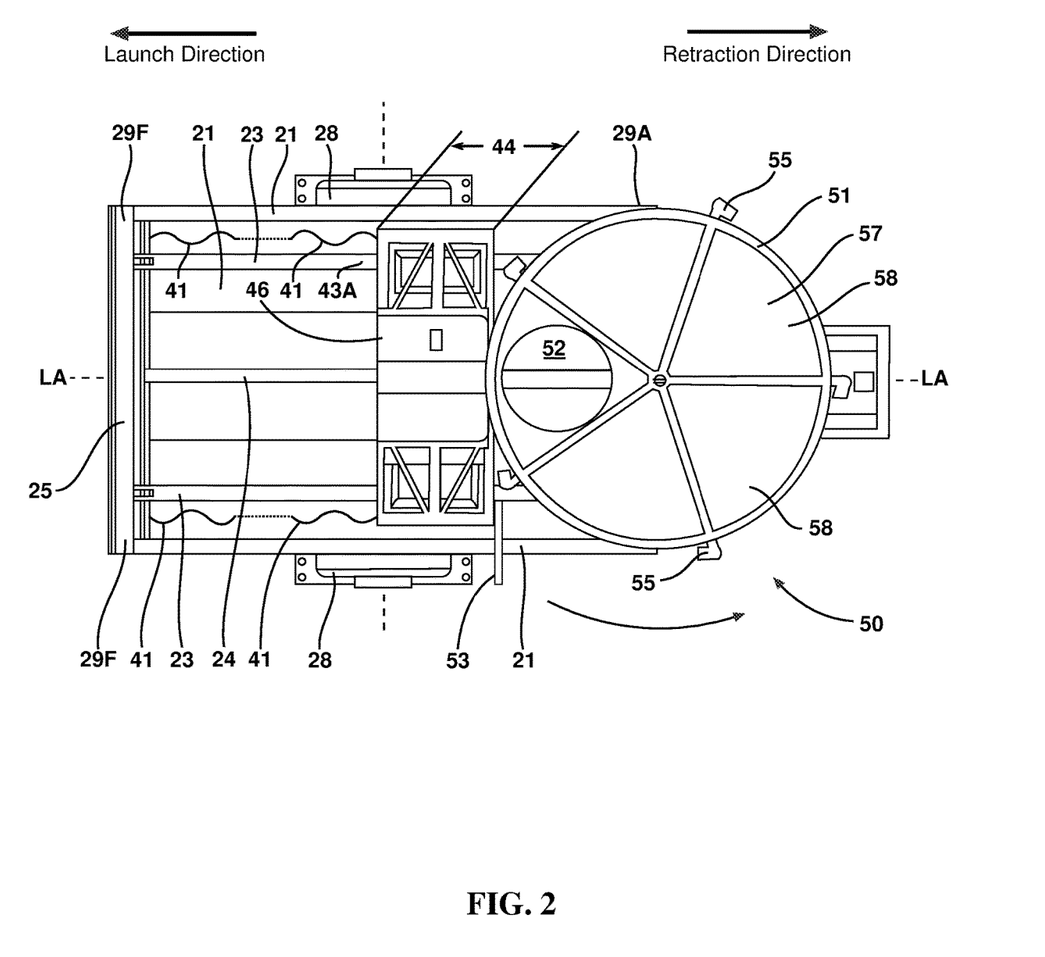
FIG. 2 is a scale top plan view the launch assembly of FIG. 1.

Referring to FIG. 1 and FIG. 2, the device 20 comprises a launch assembly 30 supported by a base 22 and defining a longitudinal axis LA. The base 22 may mobile. The base 22 comprises a frame with at least one upstanding stanchion 28 and preferably a pair of upstanding stanchions 28 for articulably supporting the launch assembly 30. The launch assembly 30 has a longitudinally opposed fore panel 29F and aft panel 29A. The fore panel 29F and aft panel 29A support at least one rail 21, and preferably a pair of rails 21 therebetween to hold the longitudinally opposed fore panel 29F and aft panel 29A in fixed relationship. A carriage 44 having a sled 45 is longitudinally translatable on the rail 22 and is spring biased towards the fore panel 29F and/or away from the rear panel. The carriage 44 is retracted against the spring 41 bias towards the rear panel by a launch motor 42L driven longitudinal screw 24. A release mechanism 43 holds the sled 45 in a predetermined longitudinal position intermediate the fore panel 29F and aft panel 29A until a launch command occurs. A magazine 50 is disposed above the launch assembly 30 for automatic reload of the payloads with or without input commands from a remote operator.

The spring 41 loaded launching mechanism can be attached to the topside of a UGV having a suitable base 22. Upon release of carriage 44, the projectile 60 is forward launched though an opening 25 in the fore panel 29F. The size of the base 22 may cover a tread 26T or wheel 26 to accommodate the launching mechanism. A suitable base 22 has been found to be rectangular with dimensions of 11 inches×6.5 inches.

An on-board control computer, such as an NVIDIA Jetson Xavier, may use the Linux Ubuntu 20.04 operating system and run the Robot Operating System (ROS) Noetic to facilitate the software/hardware interaction for autonomous operation. This computer allows for the addition of hardware and software to improve or increase capabilities. Several developers have already implemented software that provides state estimations to improve the effectiveness of autopilots in similar autonomous systems.

The forward-operating device 20 is a tracked, wheeled or stationary vehicle which may be assembled from commercial-off-the-shelf components and a custom chassis. In addition to the onboard computer, there may be one or more navigation cameras with internal processing. For example, an Intel RealSense T265 Tracking camera, and an Intel D435i Red-Green-Blue-Depth (RGBD) Camera for visual navigation and obstacle avoidance have been found suitable. The cameras both may have Inertial Measurement Units, to maintain odometery estimates during periods of latency from vision-based estimates. The drive base motors 42B may include rotary encoders which can be combined with the other sensor information by the navigation filter to improve odometry estimates.

This sensor suite is configured to enable visual-Simultaneous Localization and Mapping (vSLAM) which can be implemented by the ROS move_base package. The UGV may interacts wirelessly with a remote ground control station (GCS), such as an HP zBook 17 G5 running the Linux Ubuntu 20.04 LTS operating system and ROS Noetic Ninjemys. The GCS can provide direct tele-operation by a human operator through a USB gamepad controller, or through directional commands entered by keyboard. Alternatively, the operator can provide goal points in the ROS Visualization (RViz) application, wherein, the device 20 will autonomously determine a path, subject to a modifiable cost function, to reach the goal while avoiding obstacles detected by the depth cameras. For power the system may house a high-capacity lithium polymer rechargeable battery which supplies power to the drive base motor(s) 42B, launch motor 42L, on-board computer, and screw 24 for the launch assembly 30.

The platform standoff height preferably accommodates four-cell Lithium Polymer batteries in series, for a total power supply of 29V and 5200 mAh. The motor controller 49 (Roboteq SDC 2160) accepts 25-60V, to passes the full 29V power supply to the DC motors 42B, pulse width modulated, to provide the speed commanded by the navigation planner. Base motor 42B speed may be measured by base motor 42B encoders and controlled locally through a proportional-integral controller 49 housed on the Roboteq. A power distribution board may be used to provide separate regulated voltage sources of 12V and 5V, which are needed to power the Nvidia Jetson, WiFi Ethernet router, and Arduino microcontroller. Computer code may be used to properly position the UGV relative to the door. An open source ROS package called ArUco ROS may be used to assist with this task.

The ArUco_ROS package may be used to provide relative position and orientation in three dimensions of an optional ArUco marker in the field of view of a camera. The ArUco marker may be prepositioned to simulate a computational neural network object recognition algorithm. As soon as the marker is spotted, the package publishes the target location and orientation in the ArUco frame. These coordinates require transformation into a relevant frame for the navigation planner to act on it. To resolve this navigation, ROS/tf packages may be used to assign different local frames to different objects. In this case, there is a world frame with an origin at the initial location of the robot, a body frame that encompassed the orientation of the robot, and an ArUco frame that gives the location of the target relative to the camera(s). The ROS/tf framework allows for relatively simple coordinate transforms to clearly define the UGV's position relative to the door or other target.

The base 22 may be stationary and put in place by the operator. Or preferably the base 22 is mobile and has wheels 26, treads 26T or other features for mobility. The wheels 26 or treads 26T [collectively referred to herein as wheels 26] may be powered by a base motor 42B and associated controller 49 for mobility and control by a remote operator.

Intermediate the pair of stanchions 28 is a lift 27 connecting the base 22 and launch assembly 30. The lift 27 is operably associated with a controller 49 for extension and retraction, raising and lowering the front of the launcher, respectively. The lift 27 is selected from the group consisting of a pneumatic cylinder, telescoping linear actuator, articulating arm and jack stand. The lift 27 is operated independent of the wheels 26 according to the desired launch angle as discussed below.

Figure 3:
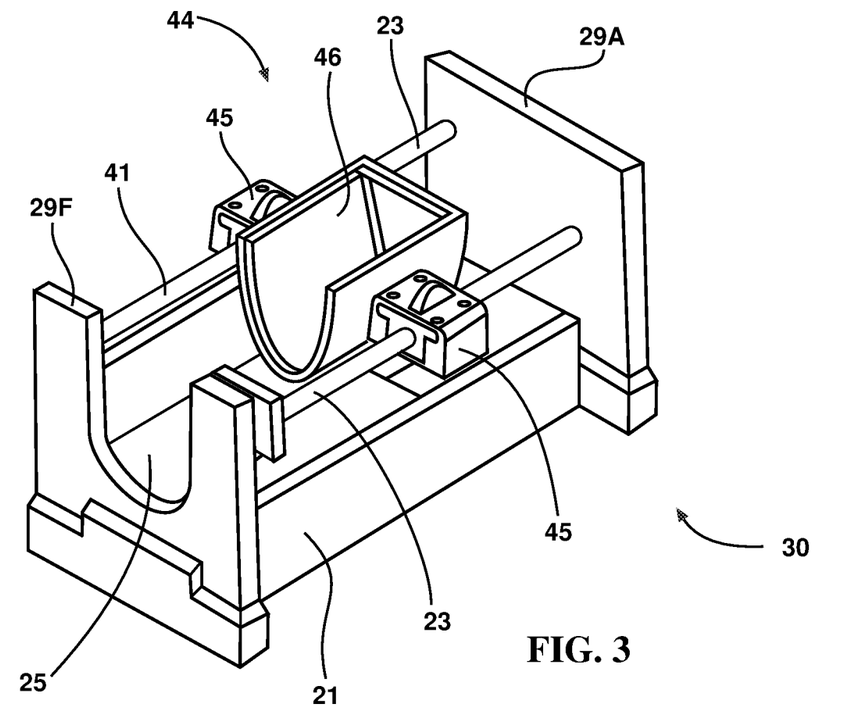
FIG. 3 is a scale perspective view of the launch assembly of FIG. 2.

Referring to FIG. 3, the launcher comprises a longitudinal central screw 24 shaft 23 which retracts the carriage 44. The carriage 44 is mounted on linear bearings supported by two longitudinal side rails 21 which flank the carriage 44. Plural springs 41 flank the carriage 44 and catapult the payload upon release. The side rails 21 and springs 41 are arranged to minimize cross-longitudinal moments. At least one retractable retaining tab 43A in front of the carriage 44 prevents premature release against the spring 41 force. The launch assembly 30 preferably comprises a force transducer disposed in the carriage 44 for weighing the projectile 60. The weight of the projectile 60 is used to determine launch angle and carriage 44 retraction as described below.

The carriage 44 longitudinally translates on two spaced apart shafts 23. The launch system overcomes the resisting force imposed by the fully loaded springs 41 which propel the carriage 44 and projectile 60 therein to the front of the UGV. To overcome this resistance, two high torque servo launch motors 42L may be used. Linear bearings are used to interface the carriage 44 on the shafts 23 to reduce friction therebetween. The linear bearings advantageously simplify the calculation of carriage 44 retraction and launch angle by eliminating the need to account for friction within the launch assembly 30.

Figure 4:
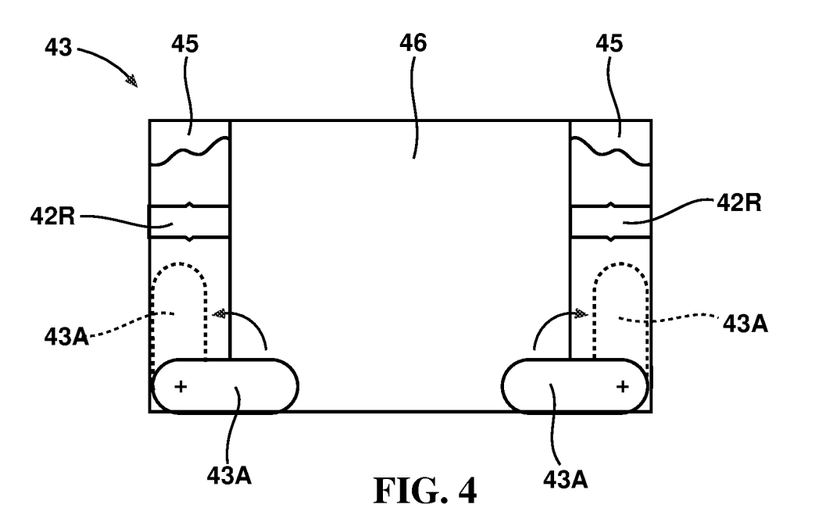
FIG. 4 is a frontal elevational view of the launch assembly of FIG. 2 with the fore panel and screw omitted for clarity.

Referring to FIG. 4, the release mechanism 43 comprises at least one tab 43A attached to the sled 45 and rotatable from a first position holding the bucket 46 in static position with respect to the fore panel 29F to a second position releasing the bucket 46 from the sled 45 whereby launch occurs. Preferably the release mechanism 43 comprises two such tabs 43A, one disposed on each side of the longitudinal axis LA for stability and controlled by paired respective servomotors.

Using two such tabs 43A requires the servo motors 42R to simultaneously actuate the retaining tabs 43A which hold the carriage 44 in place until ready to launch. The tabs 43A may anchor to the side rails 21 to retain the carriage 44 in position until ready for launch. The launch tabs 43A may rotate about respective axes parallel to the longitudinal axis LA. Upon rotation the tabs 43A release the carriage 44 to launch the projectile 60 under the bias of tension spring 41 connecting the carriage 44 to the front panel or compression spring 41 connecting the carriage 44 to the aft panel 29A.

Figure 5:
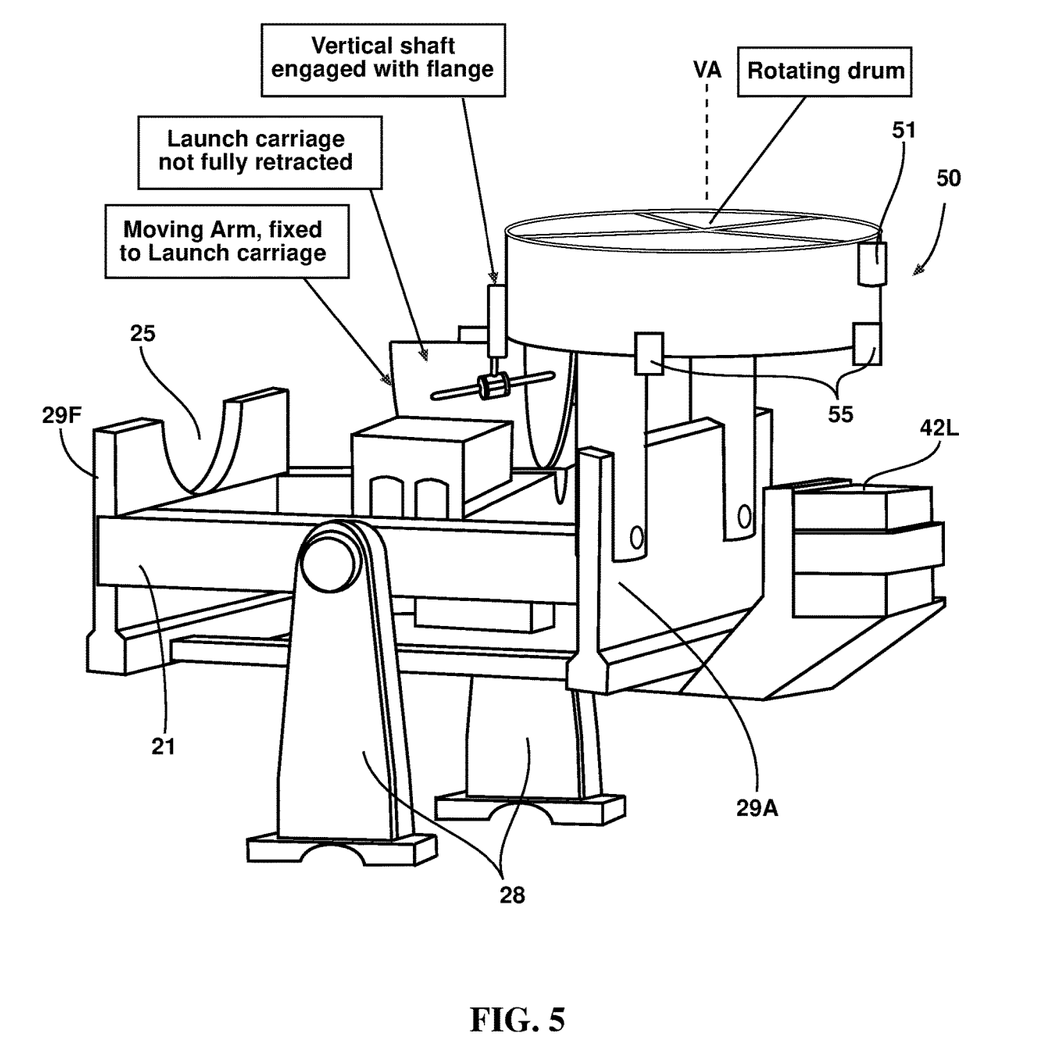
FIG. 5 is a scale perspective view of the launch assembly of FIG. 3 having stanchions and a magazine.
Figure 5A:
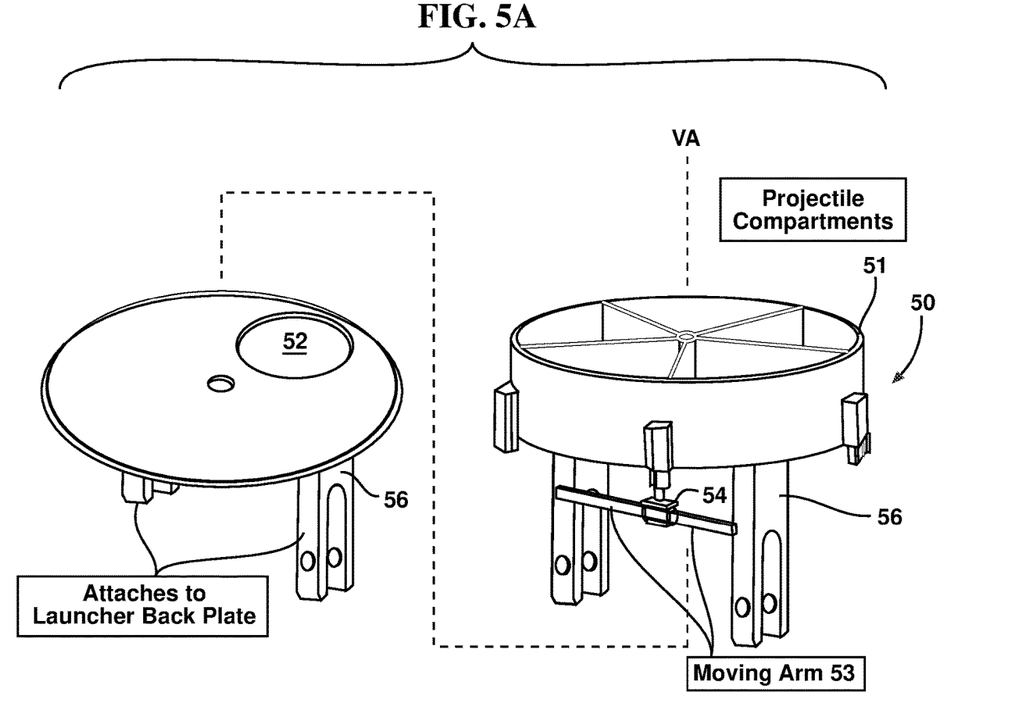
FIG. 5A is an exploded scale perspective view of the magazine of FIG. 5.

Referring to FIG. 5 and FIG. 5A, the magazine 50 for the launch assembly 30 having a longitudinally retractable bucket 46 comprises a deck plate 57. The deck plate 57 is stationary relative to the launch assembly 30 and is rotatable about a central axis VA. The central axis VA is preferably vertical. The deck plate 57 has a hole 52 therethrough. The hole 52 is vertically aligned with bucket 46 of the device 20 when the bucket 46 is longitudinally retracted to the launch position.

An axially rotatable ring 51 is disposed on the deck plate 57. The ring 51 is rotated about the central axis VA responsive to retraction of the carriage 44 or as prompted by a remote operator. The ring 51 is divided into a plurality of circumferentially spaced, and preferably adjacent, compartments 58. The compartments 58 are separated by blades 58B upstanding from the deck plate 57 and which define two adjacent compartments 58. The plurality of compartments 58 may be equally or unequally sized according to the size of the intended payloads. Compartments 58 having a circular sector shape have been found suitable, although the invention is not so limited except as may be specifically claimed below.

The ring 51 may have from 5 to 10 compartments 58, requiring the ring 51 be rotatably indexed from 72 degrees to 36 degrees, respectively. In a preferred embodiment the wring may have from 6 to 8 compartments 58, requiring the ring 51 be rotatably indexed from 60 degrees to 45 degrees, respectively.

Each compartment 58 is adapted to receive at least one payload for subsequent launch by the carriage 44. It is only necessary that the intended payload(s) fit into the desired compartment 58 and can fall through the hole 52 in the deck plate 57 to the bucket 46 under gravity influence upon registration of the payload with the hole 52 through the deck plate 57.

Figure 5B:
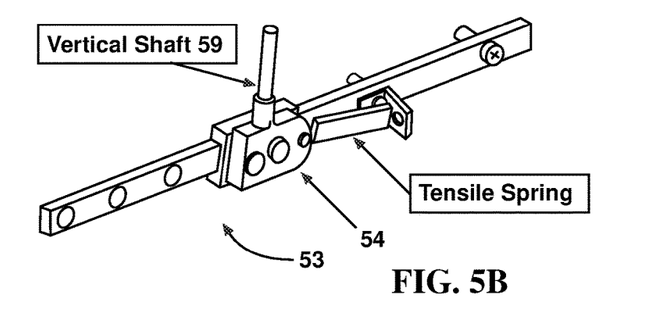
FIG. 5B is a scale perspective view of the arm and spring biased offset of FIG. 5A.
Figure 5C:
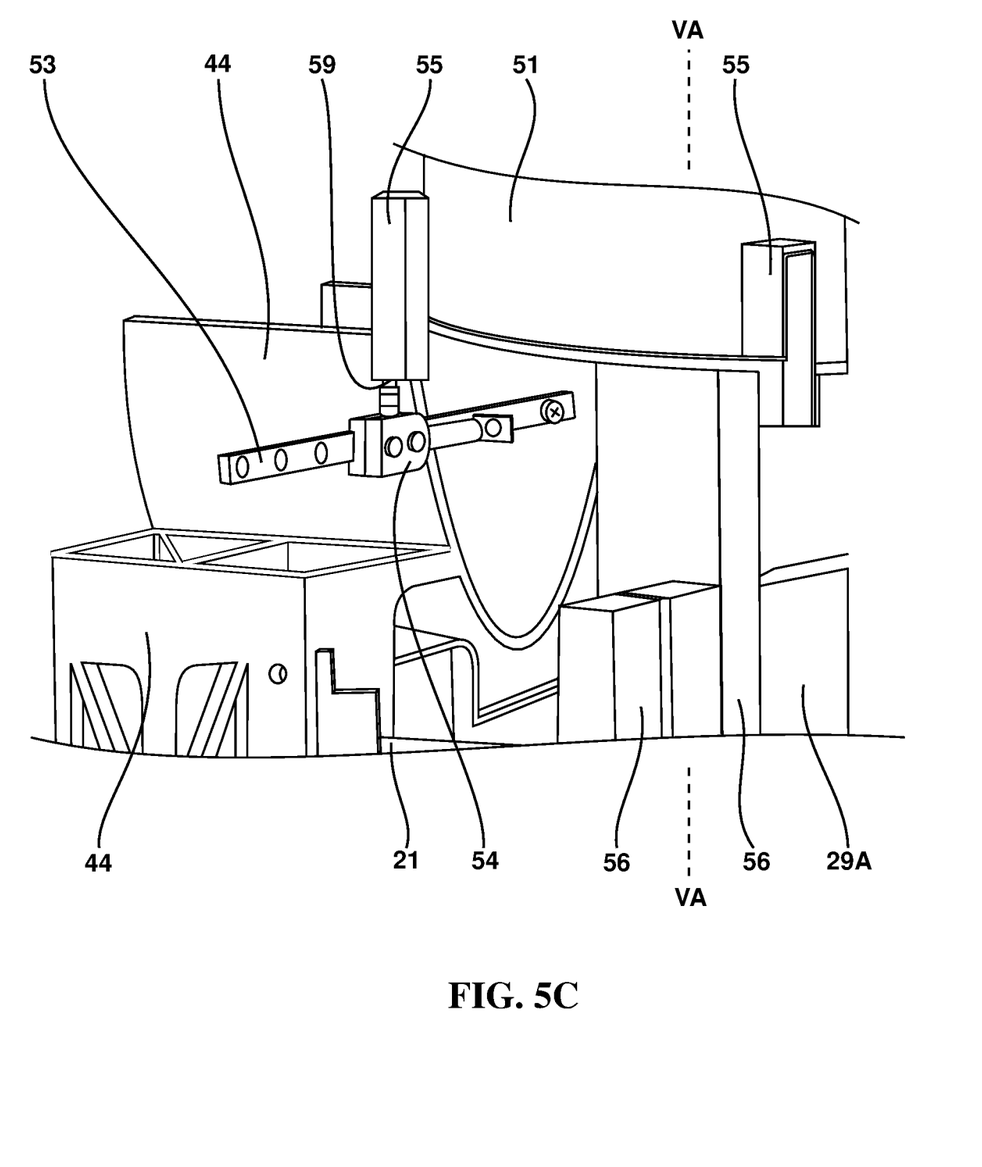
FIG. 5C is an enlarged scale view of a portion of the magazine of Figure C.
Figure 5D:
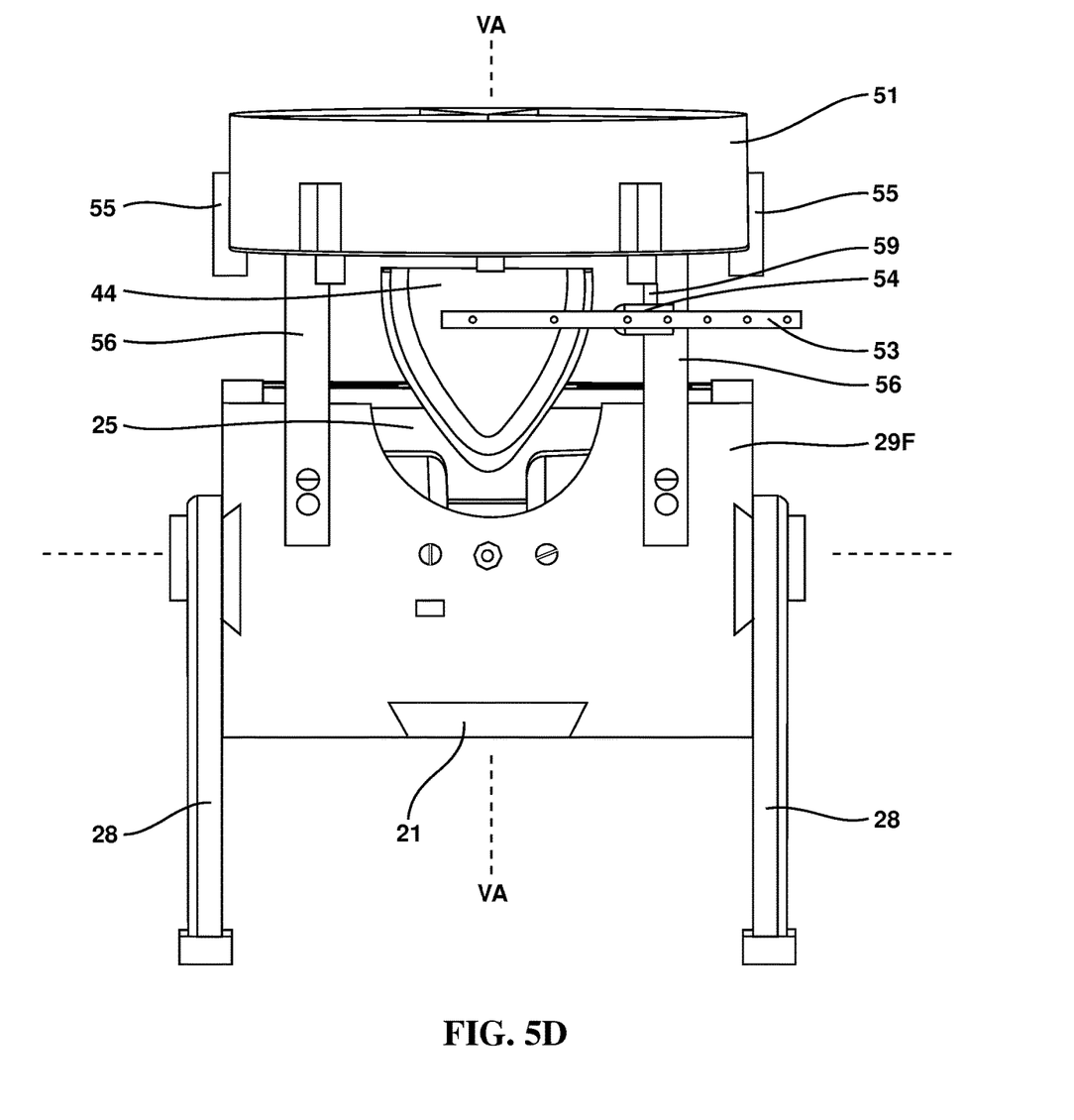
FIG. 5D is a scale frontal view of the launch assembly and magazine of FIG. 5.

Referring to FIG. 5B, FIG. 5C and FIG. 5D, the ring 51 may have an inner circumference and an outer circumference radially opposed thereto. A plurality of radially extending flanges 55 may be joined to and extend outwardly from the outer circumference of the ring 51. The flanges 55 are preferably joined to the ring 51 at positions corresponding to the blades 58B defining and separating adjacent compartments 58. Such an arrangement provides an equal number of flanges 55 and blades 58B.

The magazine 50 may be removably joined to the launch assembly 30 or otherwise to the device 20 using an attachment 56. By being removable, the magazine 50 and launch assembly 30 can be more easily accessed for inspection and maintenance. The attachment 56 may comprise one or more, and preferably a pair, of clamps which frictionally engage the device 20 and particularly the aft panel 29A thereof.

An arm 53 reciprocatingly engages one flange 55 of the ring 51, in turn and in succession as the bucket 46 is retracted by the screw 24. The arm 53 is operably associated with the bucket 46, so that the arm 53 circumferentially indexes the ring 51 one compartment 58 upon longitudinal retraction of the bucket 46. Particularly, the arm 53 may have an offset 59 joined to the arm 53 by a slider 54 and which reciprocatingly engages the one flange 55 responsive to longitudinal retraction of the arm 53. The offset 59 is cantilevered from a proximal end joined to the arm 53 and is upstanding to a distal end remote therefrom. The offset 59 is preferably longitudinally translatable relative to the arm 53.

The magazine 50 has a transverse direction perpendicular to the mutually perpendicular launch direction, retraction direction and longitudinal axis LA and wherein the offset 59 is spring 41 biased in the transverse direction tangential to the outer surface of the ring 51 and towards a point of tangency between the offset 59 and the outer surface of the ring 51.

Upon retraction of the carriage 44 under the influence of the respective launch motor 42L the offset 59 engages the flange 55 corresponding to the next launch position in a tangential vector. This engagement drives the ring 51 to rotatably index one compartment 58. The offset 59 may be spring 41 loaded to facilitate release of the flange 55 once the ring 51 has indexed and the next payload to be launched has fallen through the hole 52 in the deck plate 57.

This arrangement provides the safety benefit that the payloads can be loaded at a site remote from the hostile environment and later deployed as needed for the mission. This arrangement also provides the flexibility benefit that the payloads may selected, mixed and matched for the particular mission and expected hazards.

Figure 6:
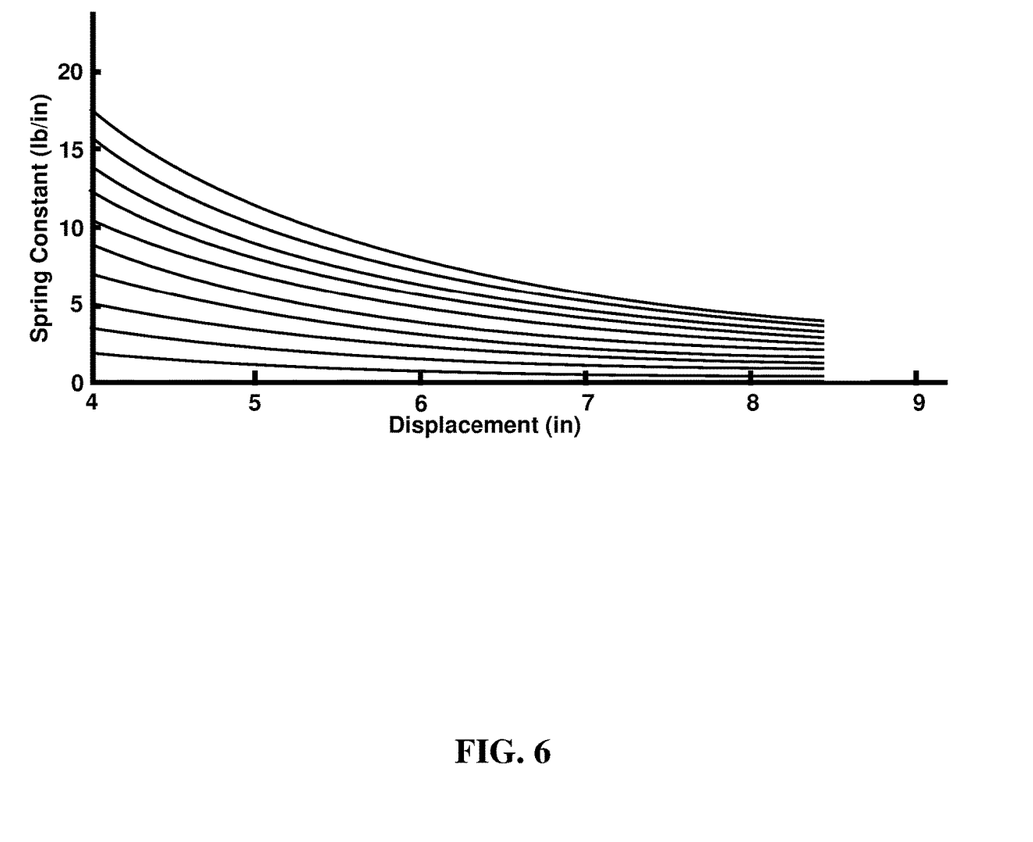
FIG. 6 is a graphical representation of spring load-deflection responses for projectiles ranging from 0.1 pound to 1.0 pounds in 0.1 pound increments subjected to bucket displacements of up to 8.5 inches. The uppermost curve is for a 1 pound projectile, the second curve is for a 0.9 pound projectile, the third curve is for a 0.8 pound projectile and so on in 0.1 pound increments until the lowermost curve is reached for a projectile of 0.1 pounds.

Referring to FIG. 6, specific spring rate functions for 10 projectiles 60 having weights of 1.0, 0.9, 0.8, 0.7, 0.6, 0.5, 0.4, 0.3, 0.2 and 0.1 pounds as presented, in order, by the top curve to the bottom curve are presented. Four springs 41 with a spring rate of 2.71 lb/in and a maximum extension of 5.5" inches were selected for one trial, yielding a total spring rate of more than 10 lb/in, thus allowing for the heaviest article (1 lb), to be launched with a total spring 41 displacement of under 5.5 inches for the carriage 44/sled 45. The carriage 44 may be biased towards the fore panel 29F away from rear panel with tension and/or compression springs 41, respectively. The springs 41 may be selected from the group consisting of coil springs 41, latex springs 41, rubber springs 41 and/or TPE springs 41.

It has been determined that a minimum initial velocity in the y-direction and x-direction can be calculated as 13.90 ft/s and 23.17 ft/s respectively. Therefore, a minimum total magnitude of velocity of 27.02 ft/s is desired for the payload to reach the target at the a desired height, e.g. 3 feet above the floor or ground, regardless of the mass of the projectile 60. Given this initial flight velocity, an appropriate spring rate can be determined for a given article mass. The system is preferably able to launch various objects, so a range of masses is considered. A conservation of energy approach can be used to calculate the needed spring 41 force for any particular launch.

The spring rate is to be chosen as follows. First the kinematic equations are used to find the initial velocities and launch angle:

$$V_{0y} = \text{SQRT}[2 \times g \times d_y] \qquad \text{a.}$$

$$t = V_{0y}/g \qquad \text{b.}$$

$$V = V_{0x} = d_x/t \text{ and} \qquad \text{c.}$$

$$\theta = \tan[V_{0y}/V_{0x}]. \qquad \text{d.}$$

Wherein $V_{0x}$ and $V_{0y}$ are initial velocities in the horizontal and vertical, with dx and dy based on the relative position to the ArUco marker or other target, θ is the launch angle from vertical. Air resistance is considered to be negligible.

These values are then used to determine a spring rate in lbs. per inch suitable for a range of different payloads as follows:

$$K = \{(m \times g \times h) + [(m \times v^2)/2]\}/6 \times d_x. \qquad \text{a.}$$

This launch angle θ is then converted into a vertical displacement using the distance from the launcher pivot to the linear actuator. Using linear interpolation, the Pulse Width Modulation (PWM) actuator command value that corresponds to the required displacement is calculated. Next, the required initial spring 41 displacement is calculated using conservation of energy as described herein. The spring 41 displacement is given by:

$$D = 12 \times \text{SQRT}\{(2/k)(m \times g \times h + (0.5 \times m \times V_0^2))\} \text{ where } V_0 \text{ is the vector sum of } V_{0x} \text{ and } V_{0y}. \qquad \text{a.}$$

This spring 41 displacement is then converted into a number of motor 42L steps through the use of the ball screw 24 lead of 0.25" per revolution and the motor 42L resolution of 200 steps/rev. This firing solution is preferably calculated by the UGV main control computer, such as a Nvidia Jetson computer, then exported over ROS serial to an Arduino microcontroller which specified step direction and speed to the NEMA motor controller 49.

The carriage 44/sled 45 is pulled into the cocked position by a jack screw 24 that is actuated by a NEMA-23 stepper motor 42L, commanded by the UGV's control computer. Two servos, which travel on the ball screw 24, may engage with the carriage 44/sled 45 to pull it backwards in preparation for launch. When commanded, the servos release the cradle, thus launching the payload. The ball screw 24 and servomotor combination advantageously allow for multiple launches per mission. Launch may occur upon command from a remote human operator or upon target acquisition.

In operation, the UGV is instructed to move to a position on the floor, in front of the ArUco marker, three meters away, facing the door. The first step is locating the ArUco marker in the world frame by transforming the published pose information from the camera frame to the body frame, then body frame to world frame. The next step is projecting the 3-D position and orientation of the ArUco marker onto the X-Y plane of the world frame, (essentially discarding the Z-position and orientation information). Next, the 2-D orientation unit vector is multiplied by 3 meters to obtain the desired goal point. Finally, this information is turned into a "goal" for the ROS move_base package, which handles the lower level base motor 42B commands to drive the UGV into position.

This process may be implemented as a continuously running loop so that the goal location and drive commands are constantly updated. This process may be problematic because the ArUco marker could go out of view of the camera, in which case, a goal point would not be computed for move_base and the UGV may "freeze." A simple workaround was to calculate an initial goal point upon first detection of the marker, then proceed to that point before updating the relative pose of the ArUco and the goal point. A threshold is set to define when the UGV's pose relative to the marker was sufficient, and further position and/or orientation corrections would not be needed. A more sophisticated approach is possible, such as an operator using a transceiver to move the UGV upon command, as determined by the cameras or other sensors.

In one exemplary and non-limiting application, the device 20 may be used to identify and infiltrate personnel doors. An algorithm is included to identify doors, position the device 20 appropriately in front of the door, calculate a trajectory, and launch the projectile 60 to the desired location on the door. This present invention advantageously provides the capability to launch a plurality of identical or different projectiles 60 to the target without the need for hands-on intervention or adjustment by an operator. The term "personnel doors" is defined as hinged wood or metal doors, typically 24-32" wide, and 72-80" tall. The target may be designated with a marker or recognized by camera and CNN.

Figure 7:
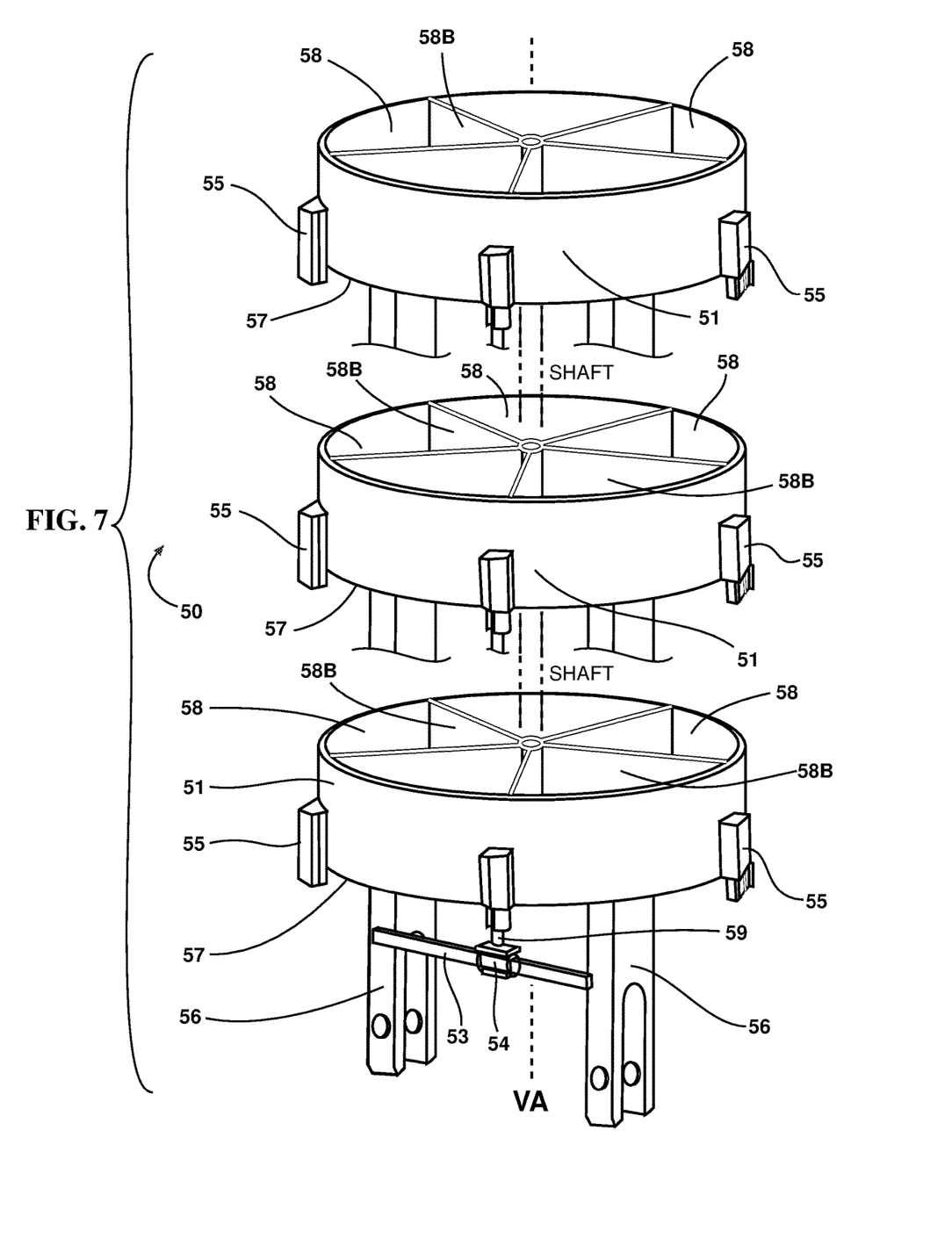
FIG. 7 is a scale perspective view of three vertically stacked trays on a common axis having a shaft of indeterminate length.

Referring to FIG. 7, in an alternative embodiment the magazine 50 may comprise a plurality of coaxial, vertically stacked trays, with three trays being shown in a nonlimiting example. As used herein, a tray refers to a stationary deck plate 57 and a corresponding axially rotatable ring 51 mounted thereon. The trays may have the same diameter or different diameters, as desired. The trays may have the same or different sizes and numbers of compartments 58, with identical compartments 58 being preferred for simplicity. The coaxial trays may be fixed to a common shaft coincident the central axis VA and synchronously driven. As with the single tray embodiment described above, the plural tray embodiment may be driven by a ring 51 drive motor to circumferentially index the trays upon retraction of the carriage 44 or upon command.

Figure 8A:
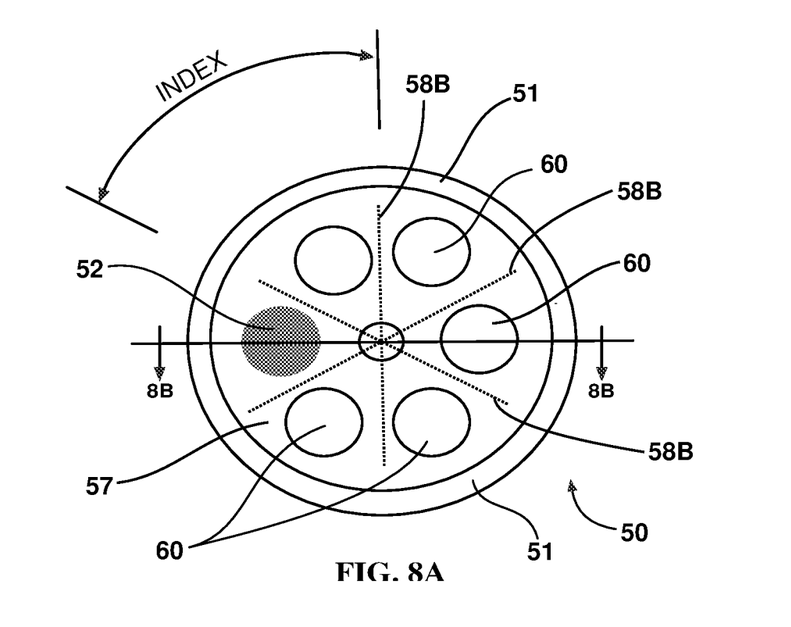
FIG. 8A is a scale top plan view of a tray having six compartments.
Figure 8B:
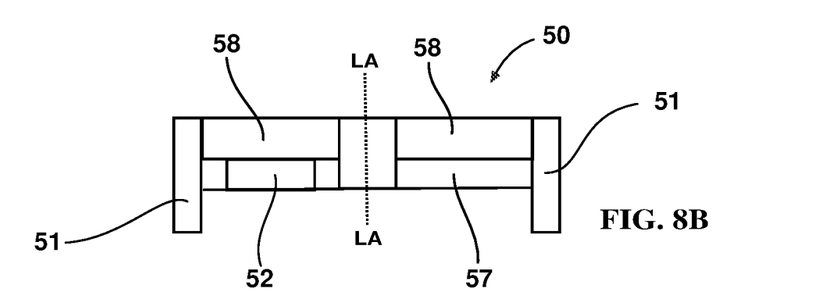
FIG. 8B is a s side elevational view of the tray shown in FIG. 8A, taken along lines 8B-8B, and omitting the blades for clarity.
Figure 8C:
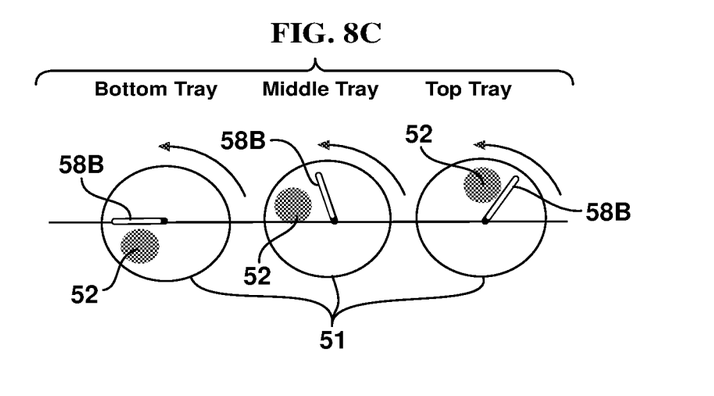
FIG. 8C is a schematic exploded top plan view of a three planar tray magazine having all but one of the blades omitted for clarity.

Referring to FIG. 8A, FIG. 8B and FIG. 8C, In such an embodiment, all of the trays are mutually concentric with the central shaft. Each tray has the aforementioned hole 52, the constraining upstanding perimeter lip and is shaft driven. The trays may be longitudinally separated from adjacent trays by a distance of 1.2 T to 2 T to prevent misalignment of the payload during the gravity drop from the superjacent tray where T is the maximum thickness of the payload and the drop is measured from the lower surface of the superjacent tray to the upper surface of the subjacent tray.

In this embodiment, the top tray may be considered as the first tray and dispenses the projectiles 60 through the dispensing hole 52, as described above, down to the second tray. The second tray may be spaced from the first tray in the longitudinal direction. When the central axis VA is vertical, the second tray is directly below the first tray, an optional third tray is directly below the second tray, and so on until the bottom tray is reached. In this embodiment, the first tray dispenses repeaters onto the second tray, the second tray dispenses repeaters onto the third tray, if present, etc. The lower or lowest tray dispenses the repeater onto the desired support surface of the environment.

In such an embodiment, preferably each tray has the same number of compartments 58 to improve balance around the central axis VA. Each tray has a circumferentially disposed first compartment 58. The first compartment 58 is immediately behind the dispensing hole 52, so that upon indexing the compartment 58 in the forward direction a first projectile 60 can be dispensed therethrough. The second compartment 58 advances to the first compartment 58 upon indexing one rotation arc. Another index of the compartment 58 rotates that compartment 58 to the dispensing hole 52 to dispense another projectile 60 therethrough, until the last compartment 58 intercepts the dispensing hole 52 to deliver a projectile 60 therethrough. In a single tray embodiment the projectile 60 is dispensed onto a support surface in a hostile environment. In a plural tray embodiment, the projectile 60 may first be dispensed from its initial payload tray to a subjacent tray, then later dispensed onto the bucket 46.

In the plural tray embodiment the dispensing hole 52 on the first (top) tray may be in a first circumferential position. The dispensing hole 52 of the first tray is longitudinally (vertically) aligned with the last position of the second tray. The dispensing hole 52 of each tray is then vertically aligned with the last position of the subjacent tray so that maximum projectile 60 capacity is achieved for each tray.

Figure 9A:
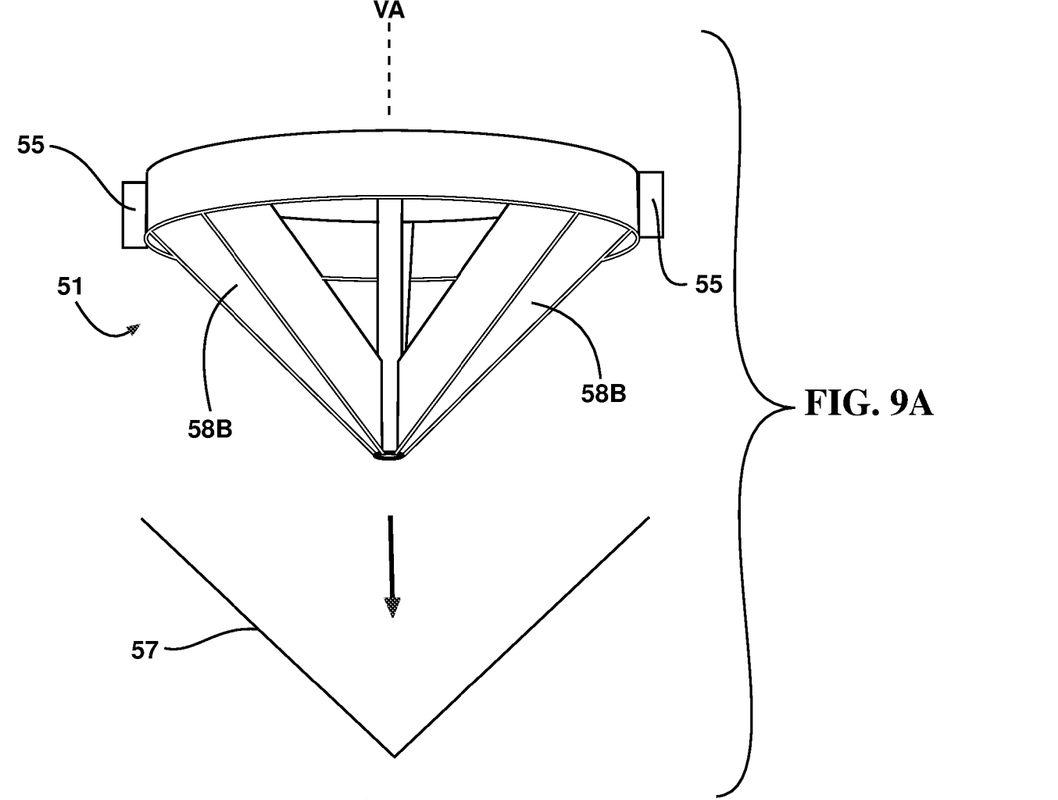
FIG. 9A is a scale perspective view of a funnel-shaped ring according to the present invention coupled with a profile view of a funnel-shaped deck.
Figure 9B:
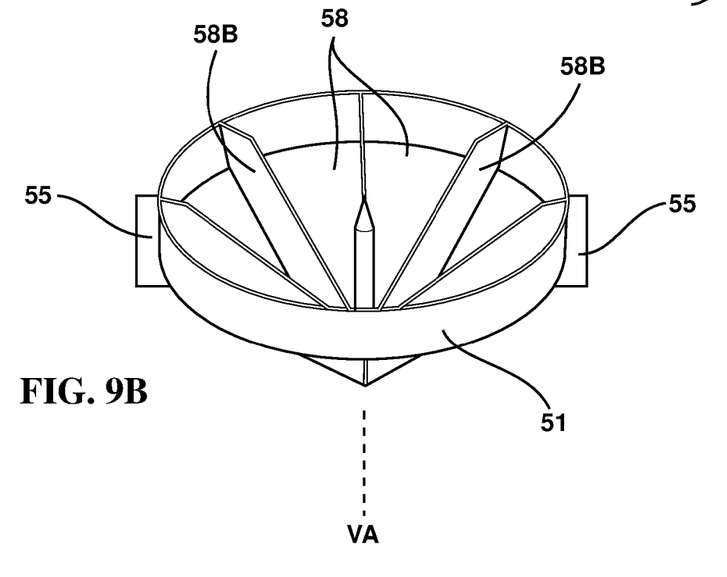
FIG. 9B is a scale perspective view of the funnel-shaped ring of FIG. 9A.

Referring to FIG. 9A and FIG. 9B, in an alternative embodiment, the ring 51 may be generally funnel shaped, converging towards the central axis VA. The subjacent deck plate 57 may have a matching geometry. This geometry advantageously urges the payload towards the central axis and a hole 52 juxtaposed therewith. Prophetically this geometry, having the matched convergent ring 51 and deck plate 57, can conserve advantageously diametrical footprint and save space when used in the hostile environment.

All values disclosed herein are not strictly limited to the exact numerical values recited. Unless otherwise specified, each such dimension is intended to mean both the recited value and a functionally equivalent range surrounding that value. For example, a dimension disclosed as "40 mm" is intended to mean "about 40 mm." Every document cited herein, including any cross referenced or related patent or application, is hereby incorporated herein by reference in its entirety unless expressly excluded or otherwise limited. The citation of any document or commercially available component is not an admission that such document or component is prior art with respect to any invention disclosed or claimed herein or that alone, or in any combination with any other document or component, teaches, suggests or discloses any such invention. Further, to the extent that any meaning or definition of a term in this document conflicts with any meaning or definition of the same term in a document incorporated by reference, the meaning or definition assigned to that term in this document shall govern. All limits shown herein as defining a range may be used with any other limit defining a range of that same parameter. That is the upper limit of one range may be used with the lower limit of another range, and vice versa. As used herein, when two components are joined or connected the components may be interchangeably contiguously joined together or connected with an intervening element therebetween. While particular embodiments of the present invention have been illustrated and described, it would be obvious to those skilled in the art that various other changes and modifications can be made without departing from the spirit and scope of the invention and that various embodiments described herein may be used in any combination or combinations. It is therefore intended the appended claims cover all such changes and modifications that are within the scope of this invention.

What is claimed is:

1. A magazine for gravity loading projectiles onto a projectile delivery device having a longitudinally retractable bucket for receiving a projectile, the magazine comprising:
   a deck plate, the deck plate being stationary relative to the projectile delivery device and having a central axis therethrough, the deck plate further having a hole therethrough and aligned with a longitudinally retractable bucket of the projectile delivery device;
   a ring disposed on the deck plate and divided into a first plurality of compartments, each compartment being sized to removably receive a projectile therein, the ring being rotatable about the central axis; and
   an arm intermittently intercepting the ring and operably associated with the longitudinally retractable bucket, the arm circumferentially indexing the ring one compartment upon longitudinal retraction of the bucket.

2. A magazine according to claim 1 wherein the deck plate is substantially planar.

3. A magazine according to claim 2 having from 5 to 10 compartments.

4. A magazine according to claim 3 having from 6 to 8 compartments.

5. A magazine according to claim 1 wherein the deck plate and ring are generally funnel-shaped, converging towards the central axis of the ring.

6. A magazine according to claim 5 wherein the deck plate and ring have a common included angle of 90 degrees to 120 degrees.

7. A magazine for gravity loading projectiles onto a projectile delivery device having a mobile bucket for receiving a projectile and being bilaterally longitudinally movable between a launch direction and a retraction direction opposed thereto, the magazine comprising:
   a deck plate, the deck plate being stationary relative to the projectile delivery device and having a central axis therethrough, the deck plate further having a hole therethrough and aligned with a longitudinally retractable bucket of the projectile delivery device;
   a ring disposed on the deck, having an inner surface and outer surface opposed thereto and divided into a first plurality of compartments by a first plurality of blades therebetween, each compartment being sized to removably receive a projectile therein, the ring being rotatable about the central axis;
   a first plurality of flanges attached to the ring and extending outwardly therefrom; and
   an arm reciprocatingly engaging one flange of the first plurality of flanges in succession and being operably associated with the bucket, the arm circumferentially indexing the ring one compartment upon longitudinal retraction of the bucket.

8. A magazine according to claim 7 wherein the arm has an offset, the offset reciprocatingly engaging the one flange responsive to longitudinal retraction of the arm.

9. A magazine according to claim 8 wherein the offset is cantilevered from a proximal end joined to the arm and is upstanding to a distal end remote therefrom.

10. A magazine according to claim 8 wherein the offset is longitudinally translatable relative to the arm.

11. A magazine according to claim 10 having a transverse direction perpendicular to the mutually perpendicular launch direction and retraction direction, wherein the offset is spring biased in the transverse direction tangential to the outer surface of the ring and towards a point of tangency between the offset and the outer surface of the ring.

12. A magazine for gravity loading projectiles onto a projectile delivery device having a longitudinally retractable bucket for receiving a projectile, the magazine comprising:
- a deck plate, the deck plate being stationary relative to the projectile delivery device and having a central axis therethrough, the deck plate further having a hole therethrough and aligned with a longitudinally retractable bucket of the projectile delivery device; and
- a ring disposed on the deck and divided into a first plurality of compartments, each compartment being sized to removably receive a projectile therein, the ring being rotatable about the central axis, the ring circumferentially indexing one compartment after launch of a projectile from the bucket.

13. A magazine according to claim 12 wherein the stationary deck plate has a hole therethrough and the ring rotatably disposed thereon collectively comprise a tray, the magazine further comprising a plurality of vertically stacked trays disposed on the central axis.

14. A magazine according to claim 13 having three round trays having the same diameter and same number of compartments therein.

15. A magazine according to claim 13 wherein each round tray has a plurality of projectiles launchably disposed in the respective compartments thereof.

16. A magazine according to claim 13 wherein each tray of the plurality of trays is disposed on a common central shaft, the central shaft being concentric with the central axis.

17. A magazine according to claim 16, further comprising a ring drive motor operably associated with the central shaft and configured to synchronously circumferentially index the plurality of trays upon command.

18. A magazine according to claim 17 wherein the command automatically occurs upon longitudinal retraction of the bucket.

19. A magazine according to claim 12 further comprising an attachment depending from the deck and adapted for removably attaching the magazine to the projectile delivery device.

20. A magazine according to claim 19 wherein the attachment comprises a pair of clamps frictionally attachable to a fore panel or an aft panel of the respective projectile delivery device.

* * * * *